(12) United States Patent
Carroll et al.

(10) Patent No.: US 8,566,227 B2
(45) Date of Patent: Oct. 22, 2013

(54) LOCATION BASED CREDIT

(75) Inventors: Chason Carroll, Dacula, GA (US); George Coutros, Jacksonsville, FL (US); John W. Giesen, Jr., Centennial, CO (US); Dennis H. James, Jr., Atlanta, GA (US); Ajay Kumar Jindia, Smyrna, GA (US)

(73) Assignee: CCIP Corp., Henderson, NV (US)

( * ) Notice: Subject to any disclaimer, the term of this patent is extended or adjusted under 35 U.S.C. 154(b) by 33 days.

(21) Appl. No.: 11/553,507

(22) Filed: Oct. 27, 2006

(65) Prior Publication Data
US 2008/0103959 A1    May 1, 2008

(51) Int. Cl.
*G06Q 40/00* (2012.01)

(52) U.S. Cl.
USPC ............ 705/38; 705/39; 705/40; 705/10; 705/14; 705/30; 705/404; 705/26; 705/35; 235/462.1; 455/414.1

(58) Field of Classification Search
USPC ......... 705/10, 14, 30, 38–40, 404, 26.64, 35, 705/26, 26.3, 14.38; 455/414.1; 235/462.1
See application file for complete search history.

(56) References Cited

U.S. PATENT DOCUMENTS

| | | | |
|---|---|---|---|
| RE29,796 E | 10/1978 | Yamamoto et al. | |
| RE32,985 E | 7/1989 | Nagata et al. | |
| 6,285,991 B1 | 9/2001 | Powar | |
| 6,697,824 B1 | 2/2004 | Bowman-Amuah | |
| 6,804,786 B1 | 10/2004 | Chamley et al. | |
| 6,877,656 B1 | 4/2005 | Jaros et al. | |
| 7,000,183 B1 | 2/2006 | Crawford, Jr. | |
| 7,047,416 B2 | 5/2006 | Wheeler et al. | |
| 7,330,826 B1* | 2/2008 | Porat et al. | 705/26.3 |
| 2001/0014868 A1* | 8/2001 | Herz et al. | 705/14 |
| 2002/0032905 A1* | 3/2002 | Sherr et al. | 725/38 |
| 2002/0055904 A1 | 5/2002 | Mon | |
| 2002/0120563 A1 | 8/2002 | McWilliam et al. | |
| 2002/0194118 A1* | 12/2002 | Nassar | 705/38 |
| 2003/0078877 A1* | 4/2003 | Beirne et al. | 705/38 |
| 2003/0135463 A1 | 7/2003 | Brown et al. | |

(Continued)

FOREIGN PATENT DOCUMENTS

EP   01/55955   8/2001
EP   02/052879   4/2002

(Continued)

OTHER PUBLICATIONS www.cs.columbia.edu/~hgs/papers/2004/NSF-PI-7DS-location.ppt.

(Continued)

*Primary Examiner* — Harish T Dass
(74) *Attorney, Agent, or Firm* — Philip H. Burrus, IV

(57) ABSTRACT

A method and system for offering credit to a prospective borrower are provided. A lender first determines a prospective borrower location, which may be a commercial outlet, such as a retail store where goods or services are offered. The lender then references a purchase history associated with the borrower at that particular location. The lender then determines the credit worthiness of the borrower. Based upon location, purchase history, and credit worthiness, the lender may deliver a customized offer of credit to the prospective borrower. The offer of credit may be location based, and may accompany a suggested good or service that is available at the prospective borrower's location.

39 Claims, 5 Drawing Sheets

(56) References Cited

U.S. PATENT DOCUMENTS

| | | | |
|---|---|---|---|
| 2004/0225545 A1 | 11/2004 | Turner et al. | |
| 2005/0004864 A1* | 1/2005 | Lent et al. | 705/38 |
| 2005/0086176 A1 | 4/2005 | Dahlgren et al. | |
| 2005/0197953 A1 | 9/2005 | Broadbent et al. | |
| 2005/0209922 A1* | 9/2005 | Hofmeister | 705/14 |
| 2005/0209938 A1* | 9/2005 | Czyzewski et al. | 705/30 |
| 2005/0251539 A1 | 11/2005 | Parekh et al. | |
| 2005/0288085 A1* | 12/2005 | Schubert et al. | 463/11 |
| 2006/0022048 A1* | 2/2006 | Johnson | 235/462.1 |
| 2006/0059084 A1 | 3/2006 | Tucker | |
| 2006/0059085 A1 | 3/2006 | Tucker | |
| 2006/0111089 A1* | 5/2006 | Winter et al. | 455/414.1 |
| 2006/0122921 A1* | 6/2006 | Comerford et al. | 705/35 |
| 2006/0173772 A1 | 8/2006 | Hayes et al. | |
| 2006/0242011 A1* | 10/2006 | Bell et al. | 705/14 |
| 2008/0065569 A1* | 3/2008 | Dutt et al. | 705/404 |

FOREIGN PATENT DOCUMENTS

| | | | |
|---|---|---|---|
| JP | 11-66396 | | 3/1999 |
| JP | 2000-3463 | | 1/2000 |
| JP | 2002-259808 | | 9/2002 |
| JP | 2002-342646 | | 11/2002 |
| JP | 2004-118674 | | 4/2004 |
| JP | 2005-108180 | | 4/2005 |
| JP | 2006-11617 | | 1/2006 |
| KR | 2004/078954 | * | 9/2004 |

OTHER PUBLICATIONS

European Patent Office, "Search Report and Written Opinion", *Application No. 06846203.5, claiming priority to PCT/US2006/060439, Purpose Intellectual Management, applicant.*

China Patent Office, "Non-Final Office Action", Chinese Patent Application Number: 200680055917.5; mailed Jul. 15, 2011.

Suzuki, Jun "Japan Industrial Publishing", "*The Future Store in Rheinberg, Germnay at a Glance*"; *Automatic Identificaiton; Japan; Japan Industrial Publishing*; Pubished Date Feb. 2, 2005; vol. 18, No. 2 pp. 29-34.

Matsuno, Koichi "Office Action from Japanese PTO", Japan Patent Application No. 2009-534561; Filed Feb. 12, 2009; Mailed Feb. 16, 2012.

Matsuno, Koichi "Office Action", Japan App No. 2009-534561; Mailed Oct. 23, 2012.

* cited by examiner

LOCATION BASED CREDIT

BACKGROUND

1. Technical Field

This invention relates generally to a system and method for extending credit, and more specifically to a system and method for extending a location-based offer of credit to a prospective borrower upon determining the prospective borrower's location.

2. Background Art

Consumers employ credit to purchase goods and services all over the world. The use of credit has many advantages. By way of example, a US citizen traveling to Canada may use the same credit card in either country without having to physically exchange US dollars for Canadian dollars, and vice versa. Additionally, consumers may carry a single credit card rather than large amounts cash. When credit cards are lost, the consumer simply has lost card cancelled and replaced with a new card. When cash is lost, however, it is generally gone forever.

Traditional credit systems work as follows: a consumer requests a credit line from a lender. The consumer then completes extensive paperwork for the lender. This paperwork includes personal information, such as name, address, and tax identification information. The paperwork may also include financial information, such as bank account information, prior borrowing information, and employment information. The lender then analyzes this and other data to determine whether a consumer is credit worthy. Where this is the case, the consumer receives a predetermined credit amount, such as $10,000. The consumer may then spend this money as needed, perhaps by check or credit card.

The problem with the conventional system is twofold: First, the consumer must apply for this credit in advance. The consumer must submit the requisite paperwork to the lender. The approval process takes a period of several days to several weeks. As such, the consumer must apply for credit long before actual needs for goods and services arise.

Second, the consumer in conventional systems is generally given general lines of credit far in excess of need. For instance, if the consumer wants a credit card for traveling, the consumer may only require $1000 to $2000 for any one trip. However, the lender may issue the consumer a card for $10,000 or $20,000. This excess of need is problematic for two reasons. First, if the spending mechanism—the credit card or check book—is lost, fraudulent charges may be excessive, thereby increasing the overall cost of credit. Next, if a consumer needs different types of credit, for example a first line for travel and a second line for home renovations, a second lender may be reluctant to lend when a first, large credit line is already in place.

There is thus a need for an improved credit offering system and method that does not require advance approval and is more in line with the consumer's actual needs.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
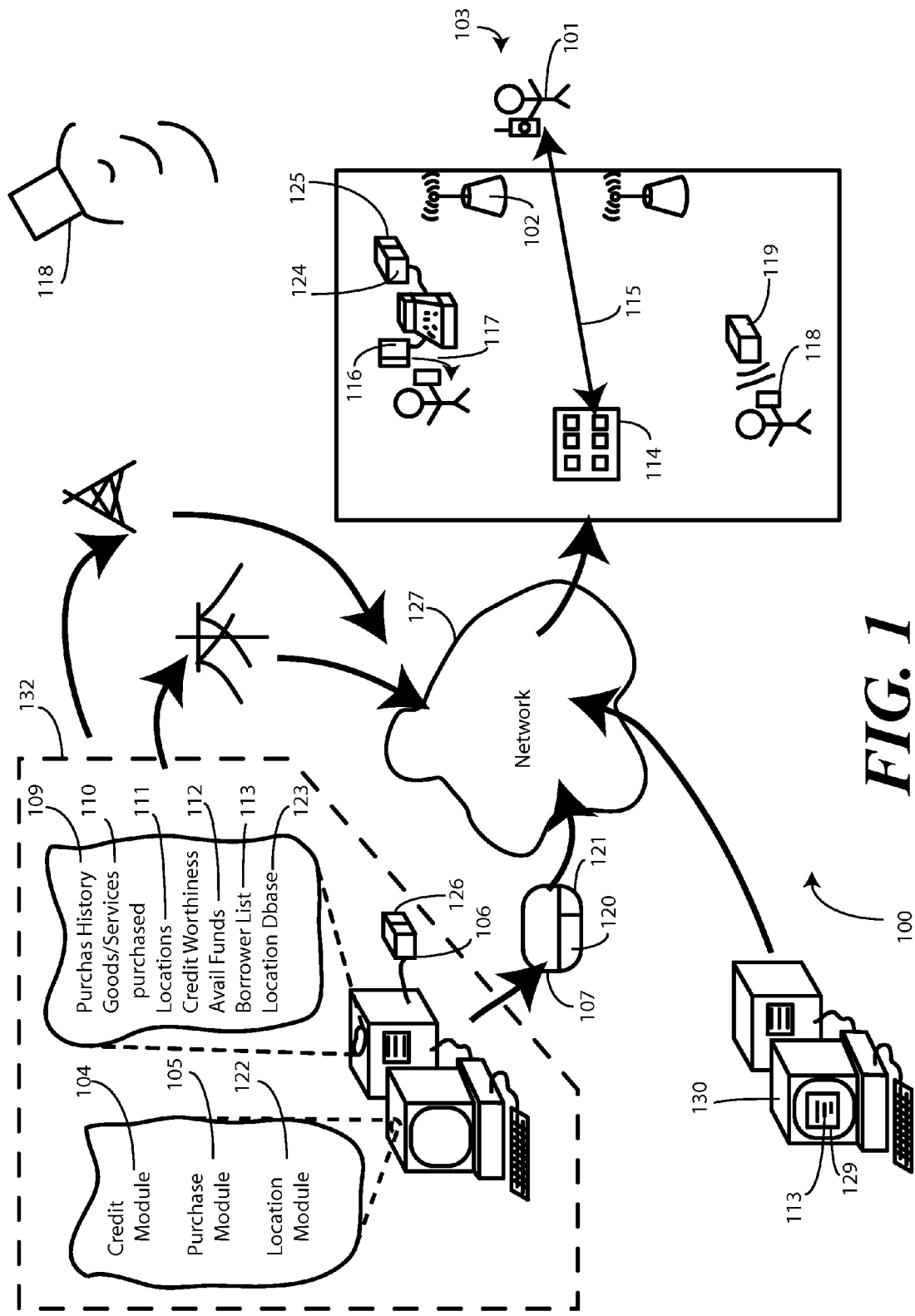
FIG. 1 illustrates one embodiment of a system for extending credit in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to extending credit based upon a determination of a prospective borrower's location. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of extending credit as described herein. The non-processor circuits may include, but are not limited to, a radio receiver, a radio transmitter, signal drivers, clock circuits, power source circuits, data bases and user input devices. As such, these functions may be interpreted as steps of a method to perform credit offering. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion.

Embodiments of the present invention provide a method and system of extending a location based offer of credit to a prospective borrower. Upon determining the location of the prospective borrower, a lender is able to transmit offers of credit to the prospective borrower. The offers of credit maybe customized or otherwise tailored to correspond to the prospective borrower's location. For instance, when a prospective borrower is in a particular store, and has made purchases there before, the lender may choose to transmit an offer of credit suitable for use in that store to purchase accessories to go with the previous purchase. By way of example, where the prospective borrower is in an electronics store, and had previously purchased a stereo, the lender may, upon determining the borrower's location and purchase history, transmit an offer of credit for speakers to go with the stereo.

In another embodiment, the lender may use the system and method to reward the consumer for prompt payment on an existing credit account. Where, for example, the borrower has an existing credit line of $1000, the lender may determine from a credit history that the borrower makes regular payments on the account. The lender may then, upon determining the borrower's location, transmit an offer for an additional amount of credit to the borrower.

In another embodiment, upon determining that the borrower has insufficient funds, the lender may employ the system and method to allow the borrower to complete a purchase. By way of example, where the borrower intends to purchase ten items from a particular store, but only has available funds to purchase nine, the lender may determine location by detecting a credit rejection. If the lender determines that the borrower is credit worthy, the lender may extend an offer of credit to the borrower in an amount sufficient to cover the tenth item.

Note also that insufficient funds may occur when the borrower has sufficient funds, yet the funds are "earmarked" for specific purchases. For instance, the borrower may have sufficient funds to purchase all ten items. However, if the ten items are discretionary, and some of the borrower's funds are earmarked for necessity purchases such as food and rent, the borrower may have insufficient funds for the ten items even though he has funds in excess of the ten-item purchase list.

In yet another embodiment, the borrower may submit a "wish list" of goods and services. For instance, if the borrower is remodeling a kitchen, the wish list may include pots, pans, cutlery, and serving dishes. Upon the lender determining the borrower's location, the lender may extend an offer of credit for one of the wish list items where the borrower's location is in close proximity to a wish list item. By way of example, when the lender determines that the borrower is entering, is near, or is in a cutlery store, the lender may transmit a location specific offer of credit to the borrower for a new, forged, 8-inch chef's knife.

Turning now to FIG. 1, illustrated therein is one embodiment of a system 100 for extending an offer of credit to a borrower 101 in accordance with the invention. The system 100 includes a prospective borrower locator 102 configured to determine a prospective borrower location 103. The prospective borrower locator 102 may take many forms. In one embodiment, the prospective borrower locator 102 is a radiofrequency device capable of determining the prospective borrower location 103 by detecting the presence of an electronic device, such as a mobile telephone or personal digital assistant. In another embodiment, the prospective borrower locator 102 is an electronic device that detects the presence of an electronically identifiable identifier, such as a radio-frequency identification device.

In another embodiment, the prospective borrower locator 102 operates in conjunction with a global positioning system 128 or assisted global positioning system to determine the prospective borrower location 103 by detecting a global positioning device disposed on the borrower's person and transmitting the prospective borrower location back to a lender 131 through a network 127. In another embodiment, the prospective borrower locator 102 comprises a mobile telephone network comprising a plurality of nodes or towers capable of detecting a prospective borrower location by triangulating a mobile telephone associated with the prospective borrower 101. It will be clear to those of ordinary skill in the art having the benefit of this disclosure that the step of determining the prospective borrower location 103 may include any of triangulating a mobile telephone, receiving radio frequency identification information, accessing electronically determined geographic coordinates associated with the prospective borrower 101, detecting a geographic location of a two-way communication device, or other equivalent means and systems. Where a two-way communication device is employed, the two-way communication device may be any of a mobile telephone, a portable computer, a personal digital assistant, or other equivalent devices.

In another embodiment, the prospective borrower locator comprises a transaction detection device 116 configured to detect a borrower transaction 117. One example of such a device is a credit card terminal. When a consumer "swipes" his credit card through the terminal, information from the credit card is routed to various entities. In one embodiment of the invention, this information is also routed to the lender 131, thereby notifying the lender of the prospective borrower location 103. In such a case, the prospective borrower transaction 117 may be a purchase transaction for goods or services.

In another embodiment of the invention, the prospective borrower locator 102 comprises a smart card reader 119 configured to detect the local presence of a smart card 118. The smart card reader 119 is then coupled to a network 127 through which the prospective borrower location 103 is transmitted to the lender 131.

Once the prospective borrower location 103 is known by the lender 131, the lender 131 employs a credit module 104 to determine the borrower's credit worthiness. In one embodiment, the credit module 104 comprises a software program operating on a computer, server, or mainframe. The software program is structured to consider information relating to the borrower 101, including personal information, financial information, and other information, to determine whether the borrower 101 is credit worthy. As used herein, credit worthiness refers to both a willingness and ability to pay for a good or service. As such, credit worthiness may include an amount of available or discretionary funds, combined with the borrower's desire to make a particular purchase.

The credit module 104 may determine credit worthiness in a variety of ways. Where the borrower 101 has an existing relationship with the lender 131, the credit module 104 may consider past transaction history, including but not limited to number of transactions, average amount of prior transactions, payments made, payments missed, average balance, and annual percentage rate. The credit module 104 may also consider other information, including bank account information. The bank account information may include average daily balance, number of deposits made, average amount of deposits made, number of withdrawals, made, average amount of withdrawals made, and the like. The credit module 104 may further consider credit information such as credit score or credit history. In one embodiment, the credit worthiness includes an available amount of funds 112 with which the prospective borrower 101 may make purchases.

Once the credit module 104 has determined credit worthiness, a purchase module 105, which may also be software operating on a computer, is configured to determine consumer information about the prospective borrower 101. The consumer information may include a purchasing history of one or more purchased goods or services. The consumer information may also include a purchase location corresponding to each of the purchases goods or services. For instance, the consumer information may include which good or service was purchased at each store, and so forth. Alternatively, the consumer information may include a borrower wish list 113 that comprises one or more desired or needed goods or services that the borrower 101 wishes or needs to purchase. Returning momentarily to the kitchen renovation example set forth above, the borrower wish list 113 may include pots, pans, cutlery, and serving dishes.

In one embodiment, the borrower wish list 113 is delivered to the lender 131 through a website 129 on a personal computer. The borrower, perhaps in conjunction with an existing credit account, logs onto the website 129 and enters the borrower wish list 113. The lender 131 then receives the borrower wish list 113 through the network 127 and stores the borrower wish list 113 in a server or data base for accessing upon determining the borrower location 103. By referencing the borrower wish list 113, the lender 131 is able to determine if the borrower 101 is within a purchasing proximity 115 of the desired goods or services 114. Where this is the case, the lender 131 may decide to transmit a location-based offer of credit 107 to the borrower 101 for the desired goods or services 114.

A credit-offering device 106 then transmits the offer of credit 107 to the prospective borrower 101 based upon the borrower location 103, credit worthiness, and consumer information. As used herein, the offer of credit 107 can include a credit line increase, a short-term loan, an installment loan, or any other financial transaction that enables one to pay. In one embodiment, the offer of credit 107 is location specific, and includes location based terms 120. These location based terms 120 may state that the offer of credit 107 is only available for the borrower's present location.

In one embodiment, the offer of credit 107 includes an opt-out provision 121. By way of example, the opt-out provision 121 may include particular channels through which the borrower 101 may or may not be contacted. For instance, the borrower 101 may approve being notified of the offer of credit 107 electronically by mobile telephone, but may not wish to have the offer of credit 107 delivered to a clerk's cash register.

In one embodiment, the credit offering device 106 extends the offer of credit 107 to the prospective borrower 101 when the prospective borrower's location 103 is within a purchasing proximity 115 with selected goods or services. These selected goods or services may be those from the borrower's wish list 113. In the alternative, the selected goods or services may include those being purchased by the borrower 101. Further, the selected goods or services may be chosen by the lender 131 from a set of available goods or services located at the borrower's location 103.

In one embodiment, the system 100 includes a location module 122 that includes a location database 123 having a list of product offerings stored therein. The list of product offerings includes a corresponding list of locations where the products offerings are located. When the lender 131 determines the prospective borrower location 103, the lender 131 may employ the location module 122 to determine which products are offered at the borrower's location 103. Once the available products or services are determined, the lender may transmit a credit offer 107 for the borrower 101 to purchase one or more of these available products or services. Said differently, when the borrower's location 103 corresponds to one of the locations associated with the available product offerings, the location module 122 may reference the location database 123 such that the credit offering device 106 may extend the offer of credit 107 for at least one of the product offerings.

In one embodiment of the invention, the borrower 101 has access to a credit response module 124 with which the borrower 101 may accept or deny the offer of credit 107. The credit response module 124 may be disposed at a point of sale, for example in conjunction with a cash register or credit card transaction detection device 116. Alternatively, the credit response module 124 may be disposed with the borrower 101, for example in an electronic device such as a mobile telephone, personal digital assistant, or global positioning device. In any of these embodiments, the credit response module 124 provides a communication channel from the borrower 101 to the lender 131 through the network 127. The credit response module 124 is configured to receive a credit response from the borrower 101, and to initiate credit services upon a positive response from the borrower 101.

Where the credit response module 124 or the borrower 101 is at a point of sale, such as a cash register or check out terminal, upon a positive response to the offer of credit 107 from the borrower 101, the borrower will often need immediate access to the funds represented in the offer of credit 107. As such, in one embodiment, the credit response module 124 includes a credit providing module, or credit provider, that is configured to give the prospective borrower prompt access to credit upon receipt of a positive credit response. Prompt access allows the borrower 101 to use the funds at the point of sale without having to return at a later date.

The offer of credit 107 may be delivered in a variety of ways through the network 127. In one embodiment of the invention, the lender 131 employs a messaging system 126 that is configured to transmit the offer of credit 107 to the borrower 101 electronically. The messaging system 126 is configured to transmit the offer of credit 107 to the borrower 101 either wirelessly or through a wired connection. The messaging system 126, in one embodiment, is configured to transmit the offer of credit 107 by one of electronic mail, voice call, text message, multimedia message, facsimile message, kiosk message, or cash register message.

Figure 2:
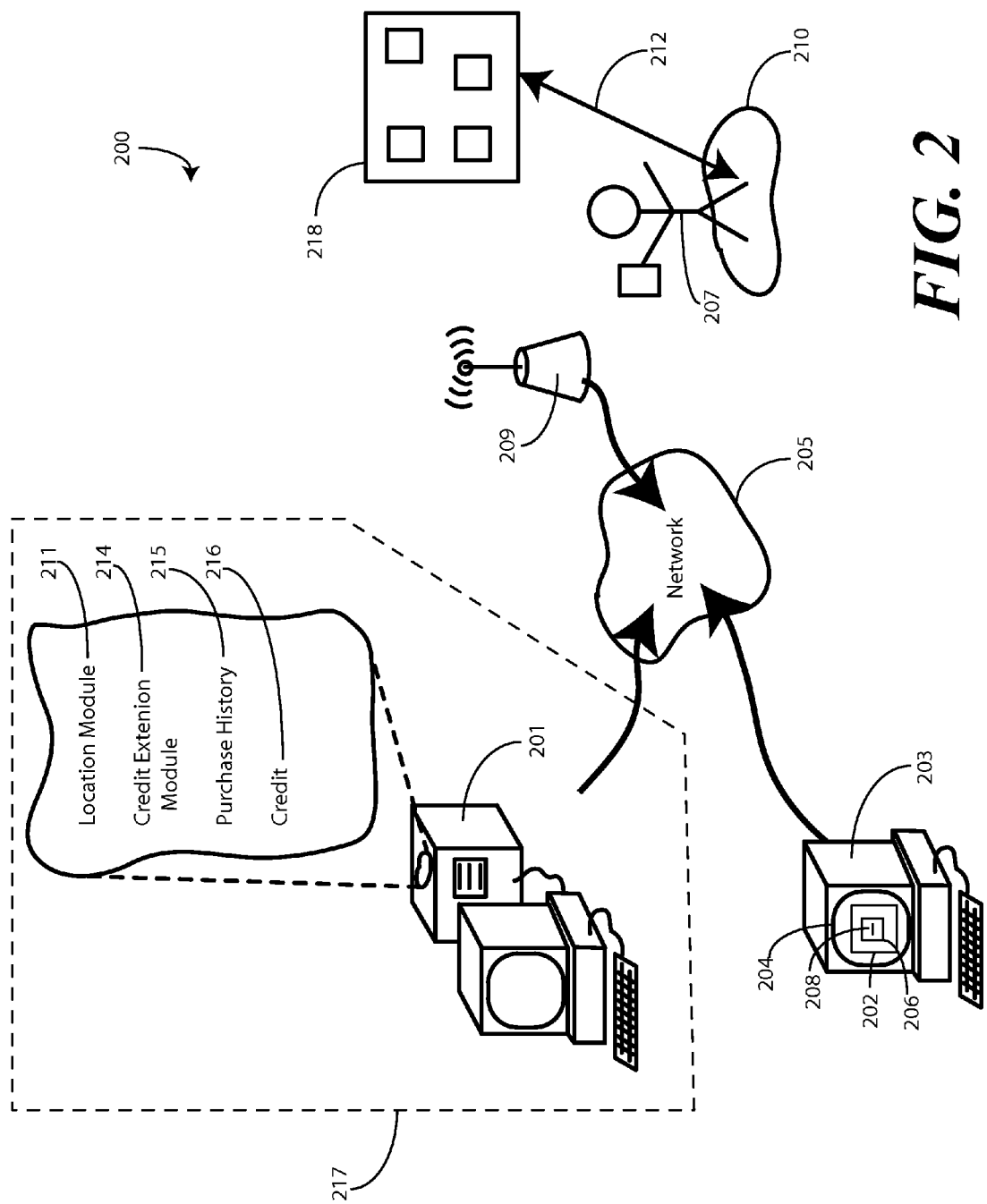
FIG. 2 illustrates one embodiment of a system for extending credit in accordance with the invention.

Turning now to FIG. 2, illustrated therein is another system for extending credit in accordance with one embodiment of the invention. In the embodiment of FIG. 2, a server 201 is configured to deliver browser readable content 202 to a client terminal 203. The client terminal 203, which may be a personal computer or portable electronic device such as a mobile telephone or personal digital assistant, has a network browser 204 that is in communication with a network 205, such as the Internet or World Wide Web.

The server 201 provides a credit prospective borrower interface 206 to the client terminal. The credit prospective borrower interface 206 may be in the form of a web page with which a prospective borrower 207 may submit information to a lender 217. For example, the prospective borrower 207 may submit a borrower wish list 208 to the lender 217 through the prospective borrower interface 206. As with FIG. 1, the borrower wish list 208, in one embodiment, includes a list of one or more desired goods or services. The lender 217 may then use this list to extend desirable offers of credit to the borrower 207 when the lender 217 determines that the borrower 207 is within a purchasing proximity of the desired goods or services.

In one embodiment, the prospective borrower interface 206 includes an opt-out provision. As noted above, the opt-out provision may include particular channels through which the borrower may or may not be contacted. For instance, the borrower may approve being notified of the offer of credit electronically by mobile telephone, but may not wish to have the offer of credit delivered to a clerk's cash register. In one embodiment, the precluded channels that may be selected by the borrower are provided with the sign up information and include cellular call (with cellular telephone number), electronic mail (with e-mail address), home call (with home telephone number), paper mail (with mailing address), and facsimile message (with fax number).

As with the embodiment of FIG. 1, a prospective borrower detection module 209 is configured to determine a prospective borrower location 210 in one of a variety of ways. In one embodiment, the prospective borrower detection module 209 determines the prospective borrower location 210 by detecting a geographic location of an electronic device, such as a mobile telephone, personal digital assistant, or global positioning device.

In another embodiment, the prospective borrower detection module 209 determines the prospective borrower location 210 by detecting a prospective borrower entry into a commercial outlet. For instance, monitors at the door of the commercial outlet, which may be a retail store, may detect either an electronic device through radio frequency communications, or may detect a radio-frequency identification tag by radio frequency communications. Alternatively, the monitors may detect a smart card when the prospective borrower 207 passes through the door of the commercial outlet.

In another embodiment, the prospective borrower detection module 209 determines the prospective borrower location 210 by detecting a prospective borrower transaction. One example of such a transaction occurs where the prospective borrower swipes a credit or debit card through a terminal at a check out stand or cash register.

A location module 211, used by the lender 217, is configured to determine if the prospective borrower location 210 is within a purchasing proximity 212 of at least one or more goods or services 218. For example, if the prospective borrower detection module 209 determines that the prospective borrower 207 is at, near, or in an electronics retailer, the location module 211 may access an inventory list, merchant provided list, subset list of promotional goods, catalog, subcatalog, or agreed upon list of products or services of that electronics retailer to determine which gadgets and widgets the retailer offers in determining that the prospective borrower 207 is within a purchasing proximity 212 to those gadgets and widgets. A credit extension module 214 then is configured to offer credit to the prospective borrower 207 when the prospective borrower location 210 is within the purchasing proximity 212 of those goods and services.

A database 215 may be used by the lender to determine prior purchases made by the prospective borrower 207. In one embodiment, the purchase history database 215 includes at least one prior purchase made by the prospective borrower 207 and a perhaps a corresponding purchase location where the purchase was made. The location module 211 may reference the purchase history database 215 to determine whether the purchases were made at the prospective borrower's current location. If so, the credit extension module 214 offers credit to the prospective borrower 207 for a complementary purchase with the prior purchase. For instance, if the prospective borrower 207 recently purchased a television, the complementary purchase may be for a DVD player or a surround-sound speaker system. By way of another example, a complementary item may include a newer version or upgraded version of a prior purchase. For instance, where the borrower purchased a portable music player a year ago, and the manufacturer has recently released a newer version that plays both music and video, the lender may transmit an offer of credit to buy the complementary item, which is the new and improved player.

A credit database 216 is used to determine whether the prospective borrower 207 has sufficient funds with which to make a purchase. In one embodiment, the credit extension module 214 is operable to transmit the offer of credit only where the credit amount available to the prospective borrower 207 is less than an amount required to purchase one or more goods or services desired by the prospective borrower 207. Using the example from the previous paragraph, if the prospective borrower used an amount of available funds for the television which left him with insufficient funds for the surround-sound system, the lender 217 may extend an offer of credit for the surround-sound system thereby enabling the prospective borrower 207 to take the system home today, rather than after making payments on the television.

Figure 3:
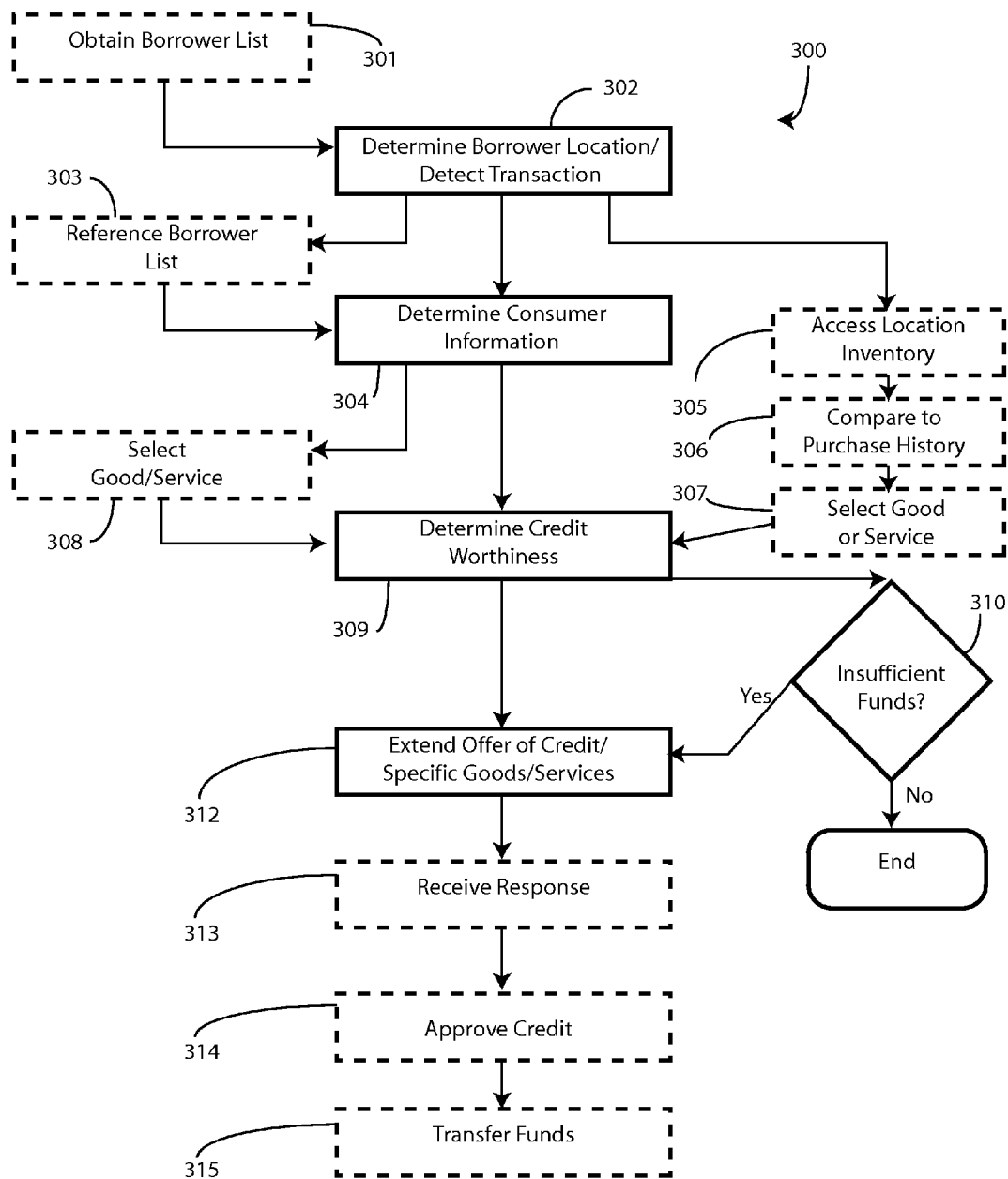
FIG. 3 illustrates one embodiment of a method for extending credit in accordance with the invention.

Turning now to FIG. 3, illustrated therein is a method 300 for extending credit in accordance with embodiments of the invention. The steps of the method 300 have generally been set forth above in the description of the system. Steps set forth in dashed lines are optional, in that they may selectively be used with the method, depending upon application.

At step 301, the lender may optionally obtain a borrower wish list of desired goods and services. This borrower wish list, which may be obtained from a web page to which the borrower logs in, includes a list of desired goods and services.

At step 302, the lender determines a prospective borrower location of the prospective borrower. As set forth above, this may be done in a variety of ways, including detecting an electronic device on the person of the borrower, detecting a radio-frequency identification tag, detecting a smart card, or detecting a borrower transaction, such as a credit card swipe.

In some cases, the prospective borrower location will be known with specificity. For example, where a given retail store places monitors or other devices at locations within the store, to detect the location of shopping carts for instance, the lender may be able to determine that the prospective borrower is at a particular location within a retail store. The lender may have knowledge, for example, of which aisle the borrower is in, and what goods or services are offered in that aisle. In such a situation, the prospective borrower location corresponds to at least one category of goods or services located within that store.

The prospective borrower location may also indicate a relative proximity to one or more goods or services at a particular location. When this is the case, i.e. when either the particular location within a retail store or the relative proximity to goods or services is known, the step of extending credit set forth below may include an offer to purchase the goods or services that are available at the borrower's location.

At step 303, where a borrower wish list was obtained at step 301, the lender references the borrower wish list upon determining the prospective borrower location to determine whether the borrower is within a purchasing proximity to any of the desired goods and services. At step 304, the borrower consults a purchasing history associated with the borrower to determine what purchases have been made in the past. Based upon the purchase history and purchasing proximity, the lender may optionally select at least one good or service from the one or more desired goods or services on the borrower wish list. Where this step is employed, the step of extending an offer of credit, which is set forth below, includes extending the offer to purchase the selected good or service.

As an alternative to selecting a good or service from the desired goods and services on the borrower wish list, the lender may optionally access a location inventory database corresponding to the prospective borrower's location at step 305. For example, if the borrower is determined to be in a sporting goods store, the lender may access an inventory database associated with that store.

Once the location inventory database is accessed, the lender may compare the location inventory database to the purchase history at step 306, for example to determine whether there are complementary items at the store. The lender may select a proposed good or service at step 307, be it complementary or not, and transmit an offer of credit for the proposed good or service, as will be described below.

At step 309, the lender determines the credit worthiness of the borrower. In one embodiment of the invention, the step of extending the offer of credit, described below, occurs only where the credit worthiness of the prospective borrower indicates that the prospective borrower has insufficient available funds with which to purchase a good or service, as determined at decision 310. In other embodiments of the invention, the credit offer is sent regardless of available funds, for example to reward the borrower for many on-time payments.

In one embodiment of the invention, the step 309 of determining credit worthiness of the prospective borrower includes detecting a credit rejection for the purchase of one or more goods or services. As the borrower may be in need of additional funds when a prospective purchase is denied, a lender may elect to transmit an offer of credit upon the prospective borrower being rejected for a sale transaction. In such a case, the lender may extend an offer of credit that is sufficient to complete the purchase of goods and services.

At step 312, the lender extends an offer of credit to the prospective borrower based upon the borrower location. The offer of credit may be extended electronically, for example by electronic mail, telephone call, text message, multimedia message, fax transmission or other suitable means. In one embodiment, the offer of credit is delivered to the borrower at a point of sale, and provides funds available for immediate use.

At optional step 313, the lender receives a response from the borrower indicating whether the borrower will accept the offer of credit. The response may be received in a fashion similar to the offer, which may include electronic mail, telephone call, text message, multimedia message, fax message, and the like.

At optional step 314, the lender may approve an amount of credit to be extended. In many embodiments of the invention, the borrower will be pre-approved prior to the extension of the offer of credit. However, in some embodiments, the lender will withhold approval until after the borrower has indicated a willingness to accept the offer. In such a scenario, the lender approves a credit amount at step 314.

At optional step 315, the lender credits an account accessible by the prospective borrower for the extended fund amount. This step provides funds that are immediately available to the borrower. Such availability is useful when the borrower is, for example, at a point of sale attempting to make a purchase.

Figure 4:
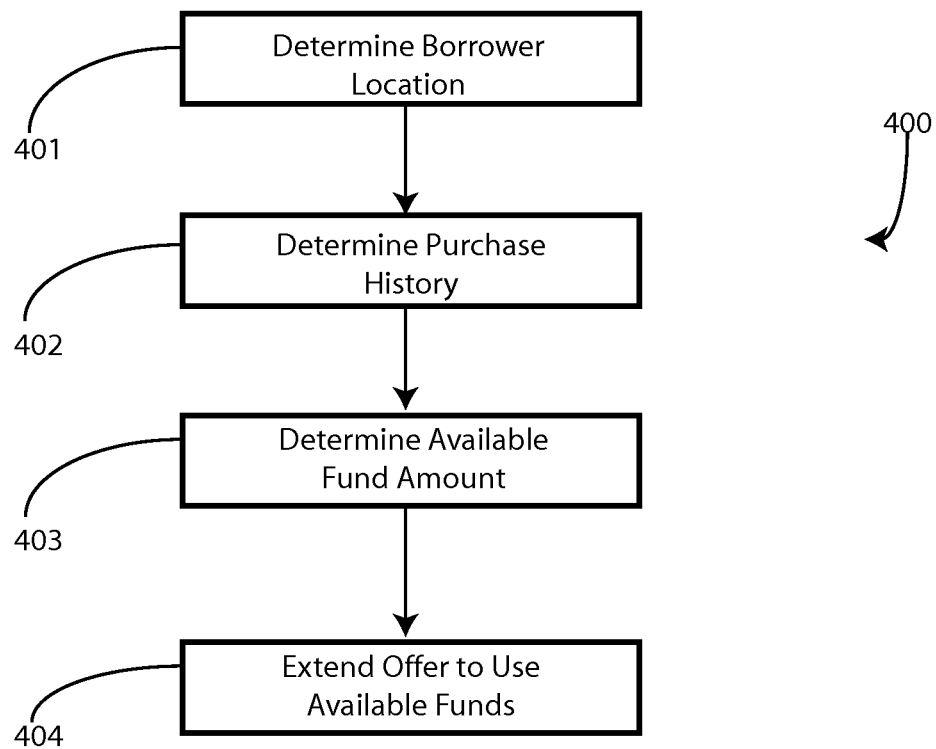
FIG. 4 illustrates one embodiment of a method for encouraging the use of credit in accordance with the invention.

Turning now to FIG. 4, illustrated therein is a method 400 for encouraging use of existing credit, suitable for situations where the prospective borrower already has an existing account or relationship with the lender. The method 400 may be used by the lender to encourage the borrower to opt for the lender's credit account over other payment options.

At step 401, the lender determines a prospective borrower location of the prospective borrower. This can be done in a variety of ways, as noted above. At step 402, the lender determines a purchase history of the prospective borrower. The purchase history may include previous purchase transactions made by the borrower at the particular borrower location.

At step 403, the lender determines an available fund amount associated with the prospective borrower. This fund amount may be an amount of available, usable funds with which the borrower may make purchases. At step 404, the lender extends an offer to use the available fund amount to the prospective borrower based upon the prospective borrower location. Thus, rather than extending an additional amount of credit as with the method of FIG. 3, the lender simply notifies the borrower, upon determining the borrower location, that a certain amount of funds are available for use for purchases. This notification may optionally include suggested goods or services available for purchase at the borrower's location.

Figure 5:
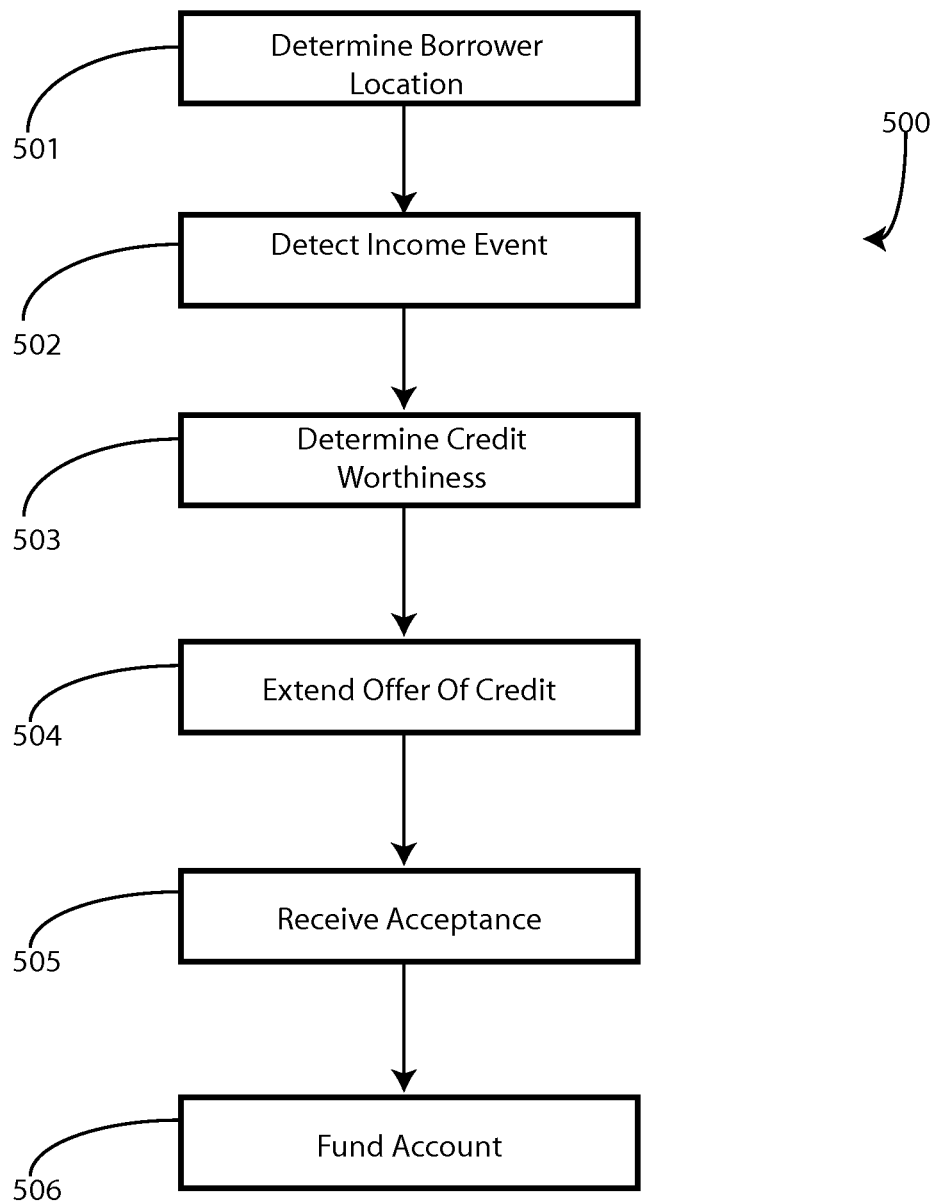
FIG. 5 illustrates one embodiment of a method for encouraging the use of credit in accordance with the invention.

Turning now to FIG. 5, illustrated therein is an alternate embodiment of a method 500 of extending credit in accordance with the invention. The method of FIG. 5 is particularly well suited for short-term, "payday" loans, in which a borrower receives a loan in the form of a cash advance. When the borrower receives a paycheck, the lender collects the borrowed money, plus any interest and fees.

At step 501, the prospective borrower's prospective borrower location is determined as described above. At step 502, an expected income event associated with the prospective borrower is detected. By way of example, a prospective lender may query the prospective borrower's bank or financial institution to determine whether a direct deposit check is expected for deposit within the next few days. Alternatively, the lender may contact the prospective borrower's employer to determine whether the borrower is to be paid within the next two weeks.

Upon detecting the expected income event, the lender may check the credit worthiness of the borrower at step 503. Where an income event is expected, and the borrower is credit worthy, the lender extends an offer of credit to the borrower at step 504. Where the borrower chooses to accept the offer, the lender receives this acceptance at step 505. The lender may then fund the account, which is accessible to the borrower, at step 506.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any elements that may cause any benefit, advantage, or solution to occur or become more pronounced are not to be construed as a critical, required, or essential features or elements of any or all the claims.

What is claimed is:

1. A method for offering credit, the method comprising:
   determining with a prospective borrower locator a prospective borrower location of a prospective borrower;
   determining consumer information with a purchase module corresponding to the prospective borrower;
   determining a credit worthiness with a credit module of the prospective borrower;

determining with a location module a relative proximity of the prospective borrower location to one or more available goods or services by accessing an inventory list to determine products and services offered at the prospective borrower location; and extending an offer of credit to the prospective borrower with a credit offering device at the determined prospective borrower location based upon the relative proximity the prospective borrower location to the one or more available goods and services;

wherein the extending the offer of credit to the prospective borrower comprises extending an offer to purchase at least one of the one or more available goods and services disposed at the prospective borrower location.

2. The method of claim 1, further comprising:

obtaining a borrower list from the prospective borrower, the borrower list comprising one or more desired goods or services;

referencing the borrower list upon determining the prospective borrower location; and selecting at least one good or service of the one or more goods or services;

wherein the extending the offer of credit to the prospective borrower comprises extending an offer of credit to purchase the at least one good or service.

3. The method of claim 2, wherein extending the offer of credit occurs only where the credit worthiness of the prospective borrower indicates that the prospective borrower has insufficient available funds to purchase the at least one good or service.

4. The method of claim 1, further comprising:

receiving a response from the prospective borrower;

approving an extended fund amount; and making available the extended fund amount to the prospective borrower. a prospective borrower account for at least the extended fund amount.

5. The method of claim 1, further comprising accessing a location inventory database corresponding to the prospective borrower location, comparing the location inventory database to the purchase history, and selecting a proposed good or service, wherein the offer of credit is to purchase the proposed good or service.

6. The method of claim 1, wherein determining the prospective borrower location comprises detecting a prospective borrower transaction.

7. The method of claim 1, wherein the prospective borrower location comprises a particular location within the retail store, wherein the particular location corresponds to at least one category of products or services within the retail store.

8. The method of claim 1, wherein the prospective borrower location comprises a relative proximity to one or more available goods or services.

9. The method of claim 8, wherein the step of extending the offer of credit to the prospective borrower comprises extending an offer of credit to allow the prospective borrower to purchase at least one of the one or more available goods and services.

10. The method of claim 8, further comprising referencing a borrower list upon determining the prospective borrower location, wherein the step of extending the offer of credit occurs where the at least one of the one or more available goods and services appears in the borrower list.

11. The method of claim 1, the one or more available goods or services comprising a complementary good.

12. The method of claim 11, wherein the complementary good comprises a newer version of a previously purchased good.

13. The method of claim 11, further comprising comparing a location inventory database with a purchase history to determine whether the complementary good is at the prospective borrower location.

14. The method of claim 1, wherein determining the credit worthiness of the prospective borrower comprises detecting a credit rejection for a purchase of one or more desired goods or services, further wherein the step of extending the offer of credit to the prospective borrower comprises extending an amount of credit sufficient to purchase the one or more desired goods or services.

15. A system for extending an offer of credit to a prospective borrower, the system comprising:

a. a prospective borrower locator configured to determine a prospective borrower location;

b. a credit module, operable with one or more processors to control the one or more processors, and configured to determine a credit worthiness of the prospective borrower;

c. a purchase module operable with the one or more processors to control the one or more processors and configured to determine consumer information about the prospective borrower, wherein the consumer information comprises a borrower list comprising one or more desired goods or services; and d. a credit offering device configured to extend an offer of credit to the prospective borrower at the determined borrower location based upon the prospective borrower location, the credit worthiness, and the consumer information.

16. The system of claim 15, wherein the consumer information comprises a purchasing history.

17. The system of claim 16, wherein the purchasing history comprises one or more purchased goods or services and one or more corresponding purchase locations.

18. The system of claim 15, wherein the credit worthiness comprises an available amount of funds with which the prospective borrower may make purchases.

19. The system of claim 15, wherein the credit offering device extends the offer of credit to the prospective borrower when the prospective borrower locator determines that the prospective borrower is within a purchasing proximity of the one or more desired goods or services.

20. The system of claim 15, wherein the prospective borrower locator comprises a transaction detection device, wherein the transaction detection device determines the prospective borrower location by detecting a prospective borrower transaction.

21. The system of claim 20, wherein the prospective borrower transaction comprises a purchase transaction of goods or services by the prospective borrower.

22. The system of claim 15, wherein the prospective borrower locator determines the prospective borrower location by way of a smart card reader coupled through a network to the system, the smart card reader detecting a presence of a prospective borrower smart card.

23. The system of claim 15, wherein the offer for credit is prospective borrower location specific.

24. The system of claim 15, further comprising a location module, operable with the one or more processors to control the one or more processors, the location module having a location database comprising a list of product offerings and corresponding locations, wherein when the prospective borrower location corresponds to one of the corresponding locations, the location module references the location database such that the credit offering device extends the offer of credit for at least one product offering from the list of product offerings.

25. The system of claim 15, wherein the prospective borrower locator comprises a location determination device selected from the group consisting of a radio frequency identification system, a global positioning system, an assisted global positioning system, and combinations thereof 26. The system of claim 15, further comprising a credit response module operable with the one or more processors to control the one or more processors and configured to receive a credit response from the prospective borrower, the credit response module further being configured to initiate credit services upon receipt of the credit response.

27. The system of claim 26, wherein the credit response module comprises a credit provider configured to give the prospective borrower prompt access to credit upon receipt of the credit response.

28. The system of claim 15, wherein the credit offering device comprises a messaging system configured to transmit the offer of credit to the prospective borrower by one of e-mail, voice call, text message, multimedia message, facsimile message, kiosk message, or cash register message.

29. A system for extending credit, the system comprising:
a server configured to deliver a browser readable content to a client terminal having a browser in communication with a network, the server providing at least a credit prospective borrower interface with which a prospective borrower may submit a borrower list comprising one or more desired goods or services;
a prospective borrower detection module configured to determine a prospective borrower location by one of detecting a geographic location of an electronic device, detecting prospective borrower entry into a commercial outlet, and detecting a prospective borrower financial transaction;
a purchase history database comprising at least one purchase and a corresponding purchase location;
a location module configured to determine if the prospective borrower location is within a purchasing proximity of at least one of the one or more desired goods or services; and
a credit extension module configured to offer credit to the prospective borrower when the prospective borrower location is within the purchasing proximity of the at least one of the one or more goods or services;
wherein the location module references the purchase history database and the credit extension module offers credit to the prospective borrower for a complementary purchase with the at least one purchase.

30. The system of claim 29, wherein the credit prospective borrower interface comprises an opt-out provision.

31. The system of claim 30, wherein the opt-out provision comprises at least one precluded communication channel.

32. The system of claim 29, further comprising a credit database comprising at least a credit amount available to the prospective borrower, wherein the credit extension module is operable when the credit amount available to the prospective borrower is less than an amount required to purchase the at least one of the one or more goods or services.

33. A method for encouraging use of existing credit, comprising the steps of:
determining a prospective borrower location of a prospective borrower with a prospective borrower locator, and
determining with the prospective borrower locator that the prospective borrower location is within a purchasing proximity of one or more goods or services;
determining a purchase history from a purchase history database of the prospective borrower;
determining an available fund amount associated with the prospective borrower;
determining whether the one or more goods or services is a complementary to a previously purchased good or service; and
where the one or more goods or services is complementary, extending an offer with a credit offering device to use the available fund amount to the prospective borrower for one or more complementary goods or services determined from the prospective borrower location.

34. A method for extending credit, the method comprising:
determining a prospective borrower location of a prospective borrower from a prospective borrower locator, wherein the prospective borrower location is within a purchasing proximity of one or more goods or services;
detecting an expected income event associated with the prospective borrower by querying a financial system associated with the prospective borrower;
determining a credit worthiness of the prospective borrower from a credit module; and
extending an offer of credit to the prospective borrower with a credit offering device, the offer being based upon the prospective borrower location, the expected income event, and the credit worthiness.

35. The method of claim 34, further comprising:
receiving an acceptance in response to the step of extending the offer of credit; and
funding an account accessible by the prospective borrower.

36. A method for offering credit, the method comprising:
determining with a prospective borrower locator a prospective borrower location of a prospective borrower by detecting a credit rejection due to insufficient borrower funds;
determining a credit worthiness with a credit module of the prospective borrower; and
extending an offer of credit to the prospective borrower with a credit offering device, at the determined prospective borrower location, due to the insufficient borrower funds determined at the prospective borrower location.

37. The method of claim 36, wherein the insufficient borrower funds comprise a portion of total borrower funds not earmarked for necessity purchases.

38. A method for offering credit, the method comprising:
determining with a prospective borrower locator a prospective borrower location of a prospective borrower by detecting a borrower entry into a commercial outlet;
determining a credit worthiness with a credit module of the prospective borrower; and
extending an offer of credit to the prospective borrower with a credit offering device, at the determined prospective borrower location, due to the insufficient borrower funds determined at the prospective borrower location.

39. The method of claim 38, further comprising:
determining the one or more goods or services comprise a primary purchase item and a complementary item; and
determining the prospective borrower has funds sufficient for only the primary purchase item;
wherein the offer of credit is for funds at least sufficient to purchase the complementary item.

* * * * *